United States Patent
Jeong et al.

(10) Patent No.: US 11,039,069 B2
(45) Date of Patent: Jun. 15, 2021

(54) WIDE-ANGLE IMAGE PROCESSING METHOD AND APPARATUS THEREFOR

(71) Applicant: Hanwha Techwin Co., Ltd., Seongnam-si (KR)

(72) Inventors: Kyoung Jeon Jeong, Seongnam-si (KR); Dae Hwan Kim, Seongnam-si (KR); Min Jung Shim, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 6 days.

(21) Appl. No.: 16/365,347

(22) Filed: Mar. 26, 2019

(65) Prior Publication Data

US 2019/0222755 A1 Jul. 18, 2019

Related U.S. Application Data

(63) Continuation of application No. PCT/KR2016/011755, filed on Oct. 19, 2016.

(30) Foreign Application Priority Data

Sep. 29, 2016 (KR) .................. 10-2016-0125587

(51) Int. Cl.
*H04N 5/232* (2006.01)
*G06T 5/00* (2006.01)
*H04N 5/262* (2006.01)
*G06F 3/0488* (2013.01)
*G06T 3/00* (2006.01)
*G06T 5/50* (2006.01)
*H04N 21/4728* (2011.01)

(52) U.S. Cl.
CPC ..... *H04N 5/23238* (2013.01); *G06F 3/04886* (2013.01); *G06T 3/0062* (2013.01);
(Continued)

(58) Field of Classification Search
CPC ........ G06F 17/30265; G06F 17/30268; H04N 13/0066; H04N 21/4147; H04N 21/4223;
(Continued)

(56) References Cited

U.S. PATENT DOCUMENTS

2005/0058360 A1* 3/2005 Berkey ................ H04N 5/2259
348/36
2009/0202169 A1* 8/2009 Hayashi ............... H04N 19/136
382/264
(Continued)

FOREIGN PATENT DOCUMENTS

JP         2015-508591        3/2015
KR      10-2000-0000080       1/2000
(Continued)

OTHER PUBLICATIONS

International Search Report dated May 23, 2017, in International Application No, PCT/KR2016/011755 (with English Translation).

*Primary Examiner* — Xi Wang
(74) *Attorney, Agent, or Firm* — H.C. Park & Associates, PLC (57) ABSTRACT

A wide-angle image processing apparatus and method includes receiving in a first client terminal having a display an original image captured by a wide-angle camera; receiving in the first client terminal a user input for selecting a first view mode for the display; requesting metadata corresponding to the first view mode from a shared memory accessible to the first client terminal and the wide-angle camera; receiving the metadata corresponding to the first view mode from the shared memory; and setting at least one region of interest in the original image based on the metadata corresponding to the first view mode.

20 Claims, 9 Drawing Sheets

(52) U.S. Cl.
CPC ......... *G06T 5/006* (2013.01); *H04N 5/23245* (2013.01); *H04N 5/23296* (2013.01); *H04N 5/2628* (2013.01); *G06T 5/50* (2013.01); *H04N 21/4728* (2013.01)

(58) Field of Classification Search
CPC .......... H04N 7/147; H04N 7/15; H04N 5/247; H04N 5/2252; H04N 5/23238; H04N 13/0055; H04N 5/265; H04N 5/23216; G08B 13/19671; G08B 13/19673; G06K 9/36; G06K 9/46
USPC ....................................................... 382/254
See application file for complete search history.

(56) References Cited

U.S. PATENT DOCUMENTS

| | | | |
|---|---|---|---|
| 2010/0111489 A1* | 5/2010 | Presler | H04N 5/3765 386/278 |
| 2010/0157020 A1 | 6/2010 | Choi et al. | |
| 2012/0249821 A1* | 10/2012 | Imai | H04N 5/772 348/222.1 |
| 2013/0166711 A1 | 6/2013 | Wang et al. | |
| 2016/0165309 A1 | 6/2016 | Van Brandenburg et al. | |
| 2016/0188647 A1* | 6/2016 | Chang | G06F 16/51 707/805 |
| 2017/0094222 A1* | 3/2017 | Tangeland | H04M 1/0264 |
| 2017/0134714 A1* | 5/2017 | Soni | H04N 13/282 |

FOREIGN PATENT DOCUMENTS

| | | |
|---|---|---|
| KR | 10-0907741 | 7/2009 |
| KR | 10-0917849 | 9/2009 |
| KR | 10-1208427 | 12/2012 |
| KR | 10-1284844 | 7/2013 |
| KR | 10-1391370 | 5/2014 |
| KR | 10-2015-0012887 | 6/2015 |
| KR | 10-1530255 | 6/2015 |
| KR | 10-2016-0032184 | 3/2016 |
| WO | 2013/095773 | 6/2013 |
| WO | 2015/014773 | 2/2015 |

* cited by examiner

WIDE-ANGLE IMAGE PROCESSING METHOD AND APPARATUS THEREFOR

CROSS-REFERENCE TO RELATED APPLICATION

This application is a Bypass Continuation of International Application No. PCT/KR2016/011755, filed on Oct. 19, 2016, and claims priority from and the benefit of Korean Patent Application No. 10-2016-0125587, filed on Sep. 29, 2016, each of which is incorporated by reference for all purposes as if fully set forth herein.

BACKGROUND

Field

Exemplary implementations of the invention relate generally to an image processing method and apparatus, and more particularly, to a wide-angle image processing method and an apparatus to share a region of interest with another device.

Discussion of the Background

A wide-angle camera such as a fish-eye camera is used to monitor public places, such as train stations, marketplaces, crossroads in the street, etc., and public buildings, such as agencies, libraries, courts, jails, etc. In addition, the fish-eye camera is used in the private sector, for example, as an alarm system, or is used to monitor individuals for whom attention is required. The fish-eye camera may be suitable for both indoor and outdoor applications. However, an original image captured by the wide-angle camera may have a variety of distortions.

The above information disclosed in this Background section is only for understanding of the background of the inventive concepts, and, therefore, it may contain information that does not constitute prior art.

SUMMARY

Wide-angle image processing methods and apparatus constructed according to the principles and exemplary embodiments of the invention are capable of sharing, with another apparatus, metadata with respect to a region of interest set in an original image.

Wide-angle image processing methods and apparatus constructed according to the principles of the invention and exemplary embodiments are capable of sharing, with another apparatus, metadata with respect to a region of interest in which the metadata is renewed.

Wide-angle image processing methods and apparatus constructed according to the principles and exemplary embodiments of the invention are capable of sharing a history of the changes in a region of interest in an original image by using sharable renewed metadata with respect to a region of interest.

Additional features of the inventive concepts will be set forth in the description which follows, and in part will be apparent from the description, or may be learned by practice of the inventive concepts.

According to one aspect of the invention, a method of wide-angle image processing includes the steps of: receiving in a first client terminal having a display an original image captured by a wide-angle camera; receiving in the first client terminal a user input for selecting a first view mode for the display; requesting metadata corresponding to the first view mode from a shared memory; receiving the metadata corresponding to the first view mode from the shared memory accessible to the first client terminal and the wide-angle camera; and setting at least one region of interest in the original image based on the metadata corresponding to the first view mode.

The metadata corresponding to the first view mode may include a virtual pan tilt zoom (PTZ) value with respect to the at least one region of interest.

The metadata corresponding to the first view mode may have a form of at least one of a JavaScript Object Notation (JSON) file, an Extensible Markup Language (XML) file, and a text (TXT) file.

The shared memory may be embedded in the wide-angle camera.

The shared memory may be provided in an external device different from the wide-angle camera.

The first view mode may be a mode for showing the original image and at least one corrected image in which distortion of the at least one region of interest is corrected.

The method may include the steps of: receiving a first user input for changing a first region of interest included in the at least one region of interest to a second region of interest, receiving a second user input for sharing the second region of interest, extracting metadata with respect to the second region of interest in response to the second user input, renewing the metadata corresponding to the first view mode by adding the metadata with respect to the second region of interest to the metadata corresponding to the first view mode, and transmitting the renewed metadata corresponding to the first view mode to the shared memory.

The step of renewing of the metadata corresponding to the first view mode may include deleting metadata with respect to the first region of interest from the metadata corresponding to the first view mode.

When the metadata corresponding to the first view mode is received from a device other than the shared memory, the method may include receiving a first user input for selecting the at least one region of interest in the original image, receiving a second user input for sharing the at least one region of interest, extracting metadata with respect to the at least one region of interest in response to the second user input, generating the metadata corresponding to the first view mode by using the metadata with respect to the at least one region of interest, and transmitting the generated metadata corresponding to the first view mode to the shared memory.

At least one operation for processing the wide-angle image may be performed by a second client terminal that is different from the first client terminal.

According to another aspect of the invention, a wide-angle image processing apparatus includes: a user interface to receive a user input for selecting a predetermined view mode; a communication interface to receive an original image from a wide-angle camera, request metadata corresponding to the first view mode from a shared memory accessible to at least two different devices, and receive the metadata corresponding to the first view mode from the shared memory; and a processor to set at least one region of interest in the original image based on the metadata corresponding to the first view mode, wherein the metadata corresponding to the first view mode is a location value with respect to the at least one region of interest.

The metadata corresponding to the first view mode may have a form of at least one of a JavaScript Object Notation (JSON) file, an Extensible Markup Language (XML) file, and a text (TXT) file.

The shared memory may be provided in an external device different from the wide-angle camera.

The first view mode may be a mode for showing on a display the original image and at least one corrected image in which distortion of the at least one region of interest is corrected.

The user interface may further be configured to receive a first user input for changing a first region of interest included in the at least one region of interest to a second region of interest and to receive a second user input for sharing the second region of interest, the processor may further be configured to renew the metadata corresponding to the first view mode by extracting metadata with respect to the second region of interest in response to the second user input and adding the metadata with respect to the second region of interest to the metadata corresponding to the first view mode, and the communication interface may further be configured to transmit the renewed metadata corresponding to the first view mode to the shared memory.

The user interface may further be configured to receive a user input for requesting a region of interest history of the first view mode, the communication interface may further be configured to request the renewed metadata corresponding to the first view mode from the shared memory and receive the renewed metadata corresponding to the first view mode from the shared memory, and the processor may further be configured to show the first region of interest and the second region of interest in the original image on a screen according to a passage of time, based on the renewed metadata corresponding to the first view mode.

The processor may further be configured to renew the metadata corresponding to the first view mode by deleting metadata with respect to the first region of interest from the metadata corresponding to the first view mode.

When the communication interface receives the metadata corresponding to the first view mode from a device other than the shared memory, the user interface may further be configured to receive the first user input for selecting the at least one region of interest in the original image and to receive the second user input for sharing the at least one region of interest, and the processor may further be configured to extract metadata with respect to the at least one region of interest in response to the second user input, generate the metadata corresponding to the first view mode by using the metadata with respect to the at least one region of interest, and transmit the generated metadata corresponding to the first view mode to the shared memory through the communication interface.

It is to be understood that both the foregoing general description and the following detailed description are exemplary and explanatory and are intended to provide further explanation of the invention as claimed.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

The embodiments of the disclosure may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements the disclosure may be implemented with any programming or scripting language such as C, C++, Java, assembler, or the like, with the various algorithms being implemented with any combination of data structures, objects, processes, routines or other programming elements. Furthermore, the disclosure could employ any number of conventional techniques for electronics configuration, signal processing and/or control, data processing and the like. The word mechanism is used broadly and is not limited to mechanical or physical embodiments, but can include software routines in conjunction with processors, etc.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
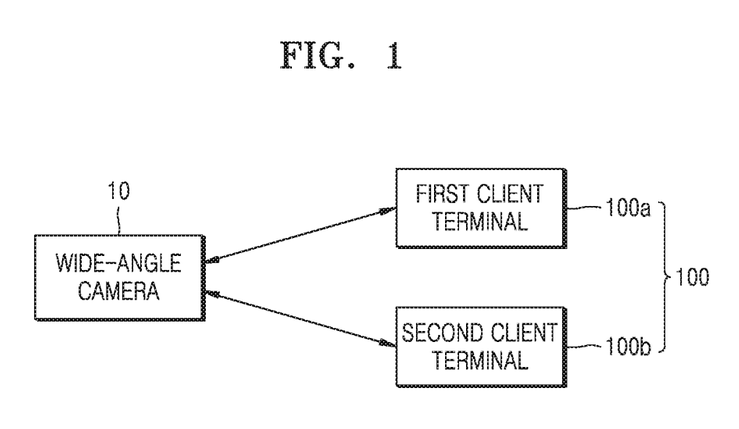
FIG. 1 is a schematic block diagram of a wide-angle image processing system constructed according to an exemplary embodiment.

FIG. 1 is schematic block diagram of a wide-angle image processing system constructed according to an exemplary embodiment.

Referring to FIG. 1, the wide-angle image processing system includes a wide-angle camera 10 and a client terminal 100.

The wide-angle camera 10 obtains an original image with respect to a monitoring region by capturing an image of the monitoring region. The wide-angle camera 10 may capture an image of the monitoring region in real time for the purpose of monitoring or security.

The wide-angle camera 10 may be a fish-eye camera having a view angle equal to or greater than 180 degrees. An original image captured by the wide-angle camera 10 may be a wide-angle image and may have a variety of distortions.

The wide-angle camera 10 may include a shared memory 20, which can be access by other devices as described herein. The shared memory 20 stores metadata corresponding to a first view mode.

A wide-angle image processing apparatus according to an embodiment may be realized as the client terminal 100.

The client terminal 100 receives the original image captured by the wide-angle camera 10 and outputs a corrected image in which distortion of the original image is corrected.

In detail, when the client terminal 100 receives the original image of the wide-angle camera 10, the client terminal 100 requests the metadata from the shared memory 20. Then, the client terminal 100 sets at least one region of interest in the original image, based on the metadata received from the shared memory 20.

The metadata may refer to a location value of the region of interest in a wide-angle image.

When the client terminal 100 does not receive the metadata from the shared memory 20, the client terminal 100 may generate metadata about at least one region of interest, in response to a user input for selecting the at least one region of interest in the original image and a user input with respect to the at least one region of interest. Also, the client terminal 100 may store the newly generated metadata in the shared memory 20.

The client terminal 100 may include one or more client terminals. For example, the client terminal 100 may include a first client terminal 100a and a second client terminal 100b. The first client terminal 100a and the second client terminal 100b may perform at least one operation for wide-angle image processing according to the embodiments in the same method.

Hereinafter, embodiments according to which the first client terminal 100a and the second client terminal 100b share the metadata stored in the shared memory 20 will be described in detail.

The first client terminal 100a may receive an original image from the wide-angle camera 10 and request metadata from the shared memory 20. When the first client terminal 100a receives the metadata from the shared memory 20, the first client terminal 100a may set at least one region of interest in the original image based on the metadata.

Likewise, the second client terminal 100b may receive metadata, which is the same as the metadata received by the first client terminal 100a, from the shared memory 20. Here, at least one region of interest set by the second client terminal 100b in the original image may be the same as the at least one region of interest set by the first client terminal 100a in the original image.

The first client terminal 100a may change the at least one region of interest set based on the metadata. Hereinafter, a previous region of interest denotes the region of interest set based on the metadata stored in the shared memory 20.

For example, the first client terminal 100a may change the previous region of interest to a new region of interest. The first client terminal 100a may extract a location value of the new region of interest, in response to a user input for sharing the new region of interest. The first client terminal 100a may add the location value of the new region of interest to the metadata received from the shared memory 20 and transmit the changed metadata to the shared memory 20.

The shared memory 20 that receives the changed metadata from the first client terminal 100a may renew the metadata.

The shared memory 20 according to an embodiment may renew the metadata by accumulating the location value of the new region of interest in relation to the location value of the previous region of interest.

Here, the shared memory 20 may store the location value of the previous region of interest together with a first time stamp and store the location value of the new region of interest together with a second time stamp. The first time stamp may indicate a setting time of the previous region of interest and the second time stamp may indicate a setting time of the new region of interest.

Thereafter, when the second client terminal 100b requests the metadata from the shared memory 20, the second client terminal 100b may receive the renewed metadata from the shared memory 20. Here, the second client terminal 100b may set at least one region of interest including the new region of interest in the original image based on the renewed metadata.

Here, the second client terminal 100b may request the renewed metadata from the shared memory 20, in response to a user input for requesting a region of interest history. The second client terminal 100a may display, on a screen, the previous region of interest and the new region of interest according to a passage of time, based on the renewed metadata.

For example, the second client terminal 100a may display the previous region of interest and the new region of interest on the original image displayed on the screen, together with the first time stamp and the second time stamp.

As another example, the second client terminal 100a may display the previous region of interest or the new region of interest on the original image displayed on the screen, and may display the previous region of interest first, and then, the new region of interest.

The shared memory 20 according to another embodiment may renew the metadata by deleting the location value of the previous region of interest and adding the location value of the new region of interest.

Figure 2A:
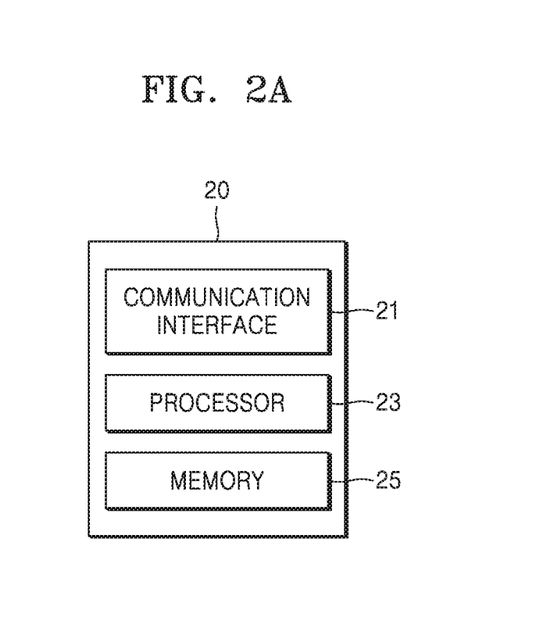
FIGS. 2A and 2B are schematic diagrams illustrating a shared memory according to an exemplary embodiment.
Figure 2B:
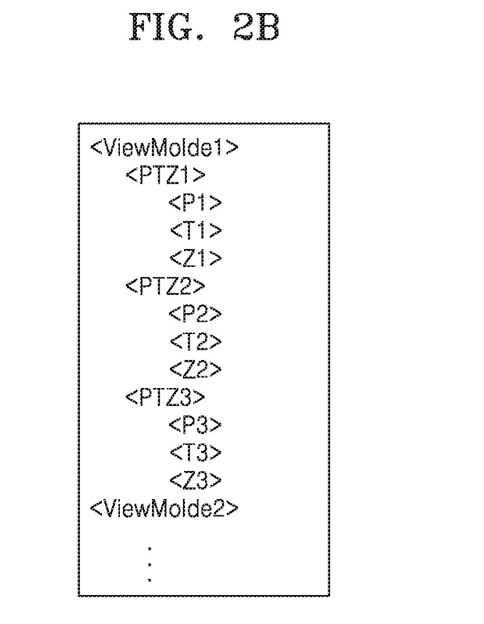

FIGS. 2A and 2B are schematic diagrams illustrating a shared memory according to an exemplary embodiment.

Referring to FIGS. 1 and 2A, the shared memory 20 includes a communication interface 21, a processor 23, and a memory 25.

The shared memory 20 is a device accessible by the client terminal 100. For example, each of the first client terminal 100a and the second client terminal 100b may access the shared memory 20.

The shared memory 20 according to an embodiment may be provided in the wide-angle camera 10. Here, the communication interface 21 of the shared memory 20 may be a communication interface of the wide-angle camera 10, the processor 23 of the shared memory 20 may be a processor of the wide-angle camera 10, and the memory 25 of the shared memory 20 may be a secure digital (SD) memory of the wide-angle camera 10. However the inventive concepts are not limited thereto.

For example, the shared memory 20 according to another embodiment may be provided in an external server. Here, the communication interface 21 of the shared memory 20 may be a communication interface of the external server, the processor 23 of the shared memory 20 may be a processor of the external server, and the memory 25 of the shared memory 20 may be a database of the external server. However, the inventive concepts are is not limited thereto.

The communication interface 21 receives a request for metadata from the client terminal 100 and transmits the metadata to the client terminal 100.

The communication interface 21 according to an embodiment may transmit the metadata having a form of coordinate data to the client terminal 100. The metadata having the form of coordinate data may be a virtual pan tilt zoom (PTZ) value.

The communication interface 21 according to another embodiment may transmit metadata having a form of a file to the client terminal 100. The metadata having the form of the file may be at least one of a javascript object notation (JSON) file, an extensible markup language (XML) file, and a text (TXT) file including the virtual PTZ value.

The processor 23 may record the metadata in the memory 25.

The processor 23 may renew the metadata stored in the memory 25, based on the metadata changed by the client terminal 100.

In detail, the processor 23 may generate the second time stamp indicating the setting time of the new region of interest, based on the metadata including the location value of the new region of interest.

The processor 23 according to an embodiment may accumulate and store the location value of the new region of interest and the second time stamp in the memory 25, in relation to the location value of the previous region of interest and the first time stamp.

The processor 23 according to another embodiment may delete the location value of the previous region of interest and the first time stamp from the memory 25 and record the location value of the new region of interest and the second time stamp in the memory 25.

The memory 25 stores the metadata.

In detail, the memory 25 may store the metadata corresponding to a first view mode.

The first view mode may be a multi view mode, that is, a mode for showing at least one of the original image, and at least one corrected image in which distortion of at least one region of interest is corrected. For example, the first view mode may be a quad view showing the original image and three corrected images.

The metadata corresponding to the first view mode may include metadata about the at least one region of interest corresponding to the at least one corrected image showed in the first view mode. For example, the metadata corresponding to the quad view mode may include at least one of the pieces of metadata about three regions of interest corresponding to three corrected images.

The metadata corresponding to the first view mode may have a form of at least one of a JSON file, an XML file, and a TXT file.

The metadata may include a location value of a region of interest and a time stamp indicating a setting time of the region of interest.

The memory 25 according to an embodiment may store the JSON file including metadata structured as shown in FIG. 2B.

Referring to FIG. 2B, the metadata corresponding to the first view mode may be recorded in the JSON file based on identification information of the view mode and identification information of the region of interest.

For example, the metadata corresponding to the quad view mode may be recorded in the JSON file based on a first view mode ViewMode 1, a first region of interest PTZ1, a second region of interest PTZ2, and a third region of interest PTZ3.

Figure 3:
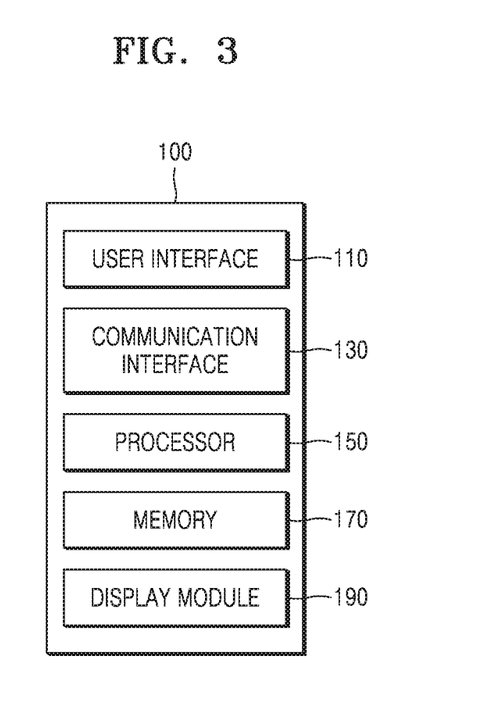
FIG. 3 is a structural block diagram of a wide-angle image processing apparatus according to an exemplary embodiment.

FIG. 3 is a structural block diagram of a wide-angle image processing apparatus according to an exemplary embodiment.

Referring to FIG. 3, the client terminal 100 includes a user interface 110, a communication interface 130, a processor 150, a memory 170, and a display module 190.

The user interface 110 receives a user input for selecting a first view mode. For example, the user interface 110 may receive the user input for selecting a quad view mode.

The user interface 110 may receive a first user input for changing a previous region of interest to a new region of interest and a second user input for sharing the new region of interest.

The first user input may be a user input for deleting the previous region of interest and adding the new region of interest. For example, the first user input may be one of selecting of the previous region of interest and dragging and dropping to the new region of interest, on an original image displayed on a screen.

The second user input may be a user input for transmitting metadata about the new region of interest to the shared memory 20. For example, the second user input may be one of mousing-over on a new corrected image in which distortion of the new region of interest displayed on the screen is corrected.

The user interface 110 may receive a user input for requesting a region of interest history of a first view mode. For example, the user interface 110 may receive the user input for requesting the region of interest history of a quad view mode.

The user interface 110 may receive a third user input for selecting at least one region of interest in the original image. For example, the third user input may be a selection of any one point in the original image.

The user interface 110 may include an input device provided for a user to select a desired region of the original image, such as a keyboard, a mouse, a button, a dome switch, a jog wheel, a jog switch, a microphone, a pointer, a touch panel, etc.

The communication interface 130 receives the original image from the wide-angle camera 10, requests metadata corresponding to a first view mode from the shared memory 20, and receives the metadata corresponding to the first view mode from the shared memory 20. For example, the communication interface 130 may request the metadata corresponding to the quad view mode from the shared memory 20 and may receive the metadata corresponding to the quad view mode from shared memory 20.

The metadata corresponding to the quad view mode may be a JSON file including all pieces of metadata about three regions of interest or may be a piece of metadata about one region of interest from among three pieces of metadata about the three regions of interest.

The communication interface 130 may transmit renewed metadata corresponding to the first view mode to the shared memory 20.

The renewed metadata corresponding to the first view mode may be metadata in which at least a portion of the metadata corresponding to the first view mode received from the shared memory 20 is deleted and/or added.

The communication interface 130 may request the renewed metadata corresponding to the first view mode from the shared memory 20 and receive the renewed metadata corresponding to the first view mode from the shared memory 20.

The communication interface 130 may communicate with the wide-angle camera 10 via, for example, a wireless network, a wired network, a public network such as the Internet, a private network, a global system for mobile communication (GSM) network, a general packet radio (GPRS) network, a local area network (LAN), a wide area network (WAN), a metropolitan area network (MAN), a cellular network, a public switched telephone network (PSTN), a personal area network, Bluetooth, Wi-fi Direct, near field communication, ultra wide band, a combination thereof, or any other networks.

The processor 150 sets at least one region of interest in the original image based on the metadata corresponding to the first view mode. For example, the processor 150 may set three regions of interest in the original image, based on the metadata corresponding to the quad view mode transmitted from the shared memory 20.

According to one or more exemplary embodiments, by setting the region of interest of the original image based on the metadata transmitted from the shared memory 20, the region of interest of the original image set by the other apparatus may be shared.

The processor 150 may renew the metadata corresponding to the first view mode by extracting metadata about a new region of interest in response to the second user input for sharing the new region of interest and adding the metadata about the new region of interest to the metadata corresponding to the first view mode.

The processor 150 according to an embodiment may renew the metadata corresponding to the quad view mode, by adding the metadata about the new region of interest to the JSON file including the metadata corresponding to the quad view mode.

The processor 150 according to another embodiment may renew the metadata corresponding to the quad view mode, by changing metadata about the previous region of interest to the metadata about the new region of interest.

When a predetermined period of time passes based on a time point in which the first user input is received through the user interface 110, the processor 150 may renew the metadata corresponding to the first view mode by extracting the metadata about the new region of interest and adding the metadata about the new region of interest to the metadata corresponding to the first view mode.

According to the exemplary embodiments, by renewing the metadata stored in the shared memory 20, the changed region of interest in the original image may be shared with another apparatus.

The processor 150 may show the previous region of interest and the new region of interest in the original image on a screen according to a passage of time, based on the renewed metadata corresponding to the first view mode. Here, the renewed metadata corresponding to the first view mode may include the metadata about the previous region of interest and the metadata about the new region of interest.

According to one or more exemplary embodiments, through the renewed metadata stored in the shared memory 20, the history of the changed region of interest of the original image may be shared with another apparatus.

The processor 150 may renew the metadata corresponding to the first view mode by adding metadata about the new region of interest to the metadata corresponding to the first view mode and deleting the metadata about the previous region of interest from the metadata corresponding to the first view mode.

The processor 150 may extract metadata about at least one region of interest in response to the third user input for selecting the at least one region of interest, generate metadata corresponding to the first view mode by using the metadata about the at least one region of interest, and transmit the generated metadata corresponding to the first view mode to the shared memory 20 through the communication interface 110.

The processor 150 may generate the metadata corresponding to the first view mode, when the processor 150 requests, through the communication interface 110, the metadata corresponding to the first view mode from the shared memory 20 and does not receive the metadata corresponding to the first view mode from the shared memory 20.

According to one or more exemplary embodiments, by storing the metadata about the region of interest set in the original image in the shared memory 20, the region of interest of the original image may be shared with another apparatus.

Figure 4A:
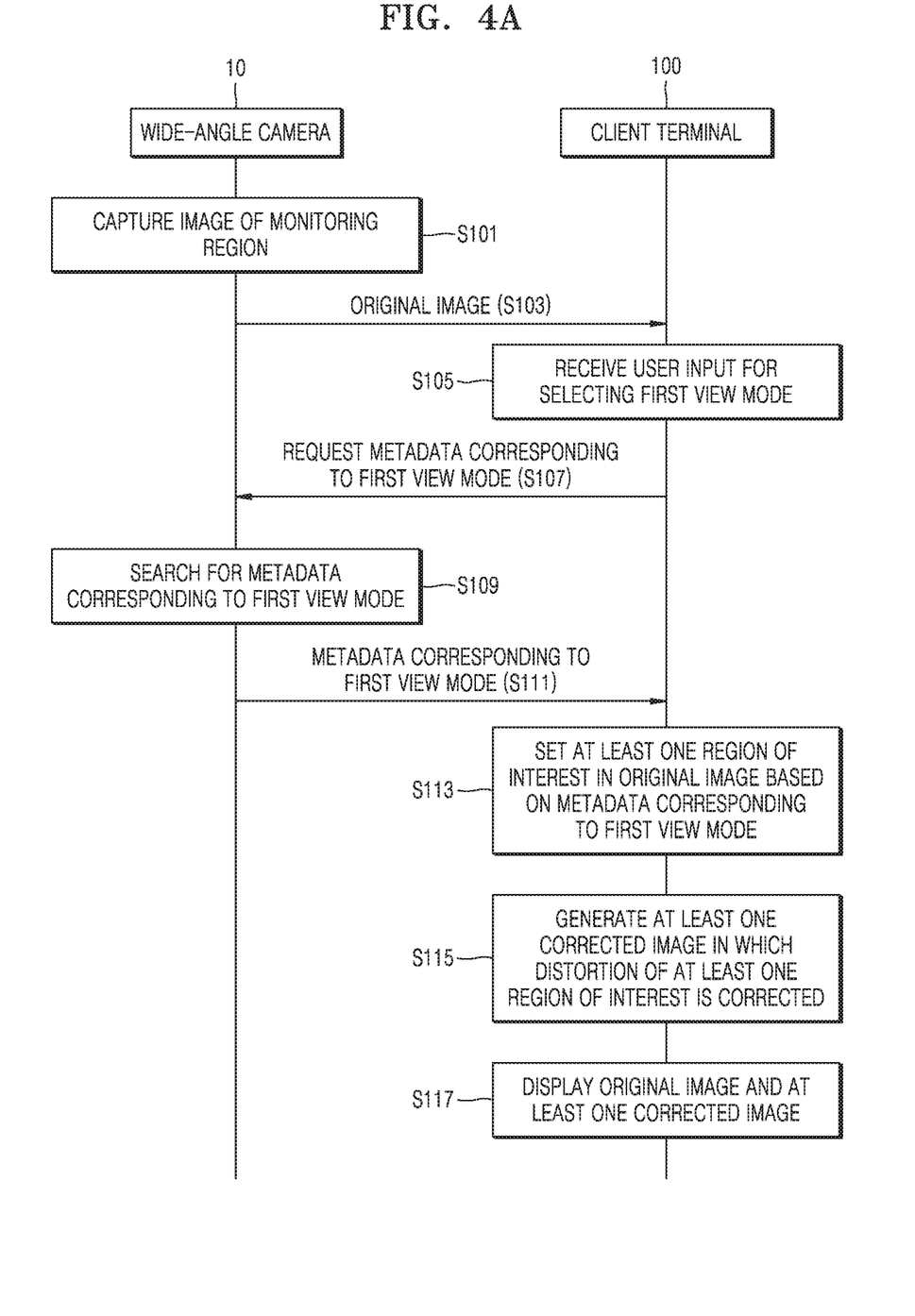
FIG. 4A is a flow chart and FIG. 4B is a schematic block diagram of a display in quad view mode illustrating a wide-angle image processing method according to an exemplary embodiment.
Figure 4B:
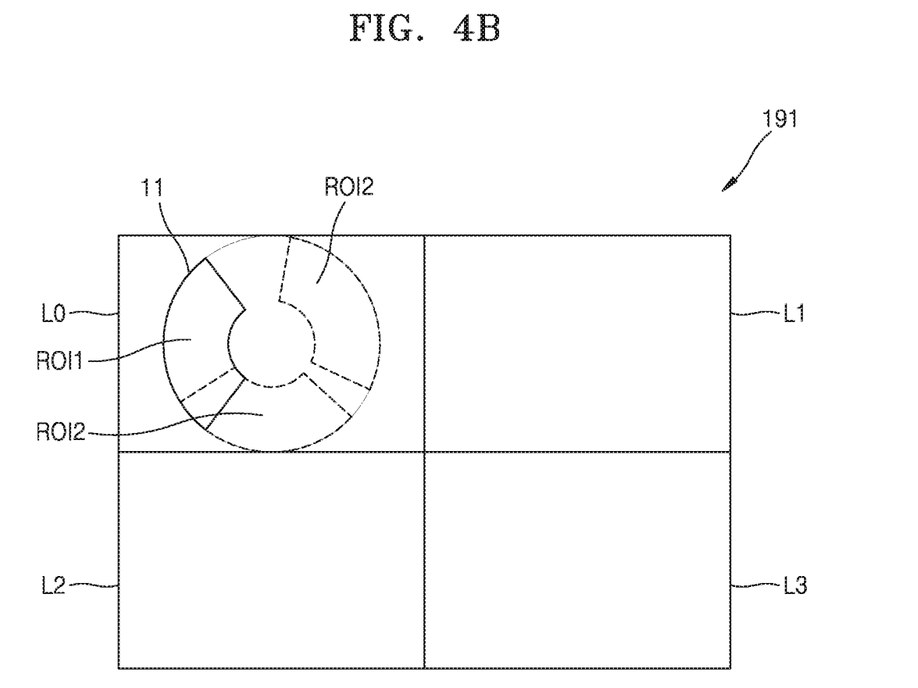

FIG. 4A is a flow chart and FIG. 4B is a schematic block diagram of a display in quad view mode illustrating a wide-angle image processing method, according to an exemplary embodiment.

Referring to FIGS. 4A and 4B, the wide-angle camera 10 obtains an original image, which is a wide-angle image, by capturing an image of a monitoring region (S101).

The client terminal 100 receives the original image 11 captured by the wide-angle camera 10 (S103).

The client terminal 100 receives a user input for selecting a first view mode (S105). For example, the first view mode may be a quad view mode.

Next, the client terminal 100 requests metadata corresponding to the first view mode from the wide-angle camera 10 including the shared memory 20 (S107).

The wide-angle camera 10 searches for the metadata corresponding to the first view mode in the shared memory 20 in response to the request of the client terminal 100 (S109). Here, the wide-angle camera 10 may search for the metadata corresponding to the quad view mode in a JSON file, an XML, file, or a TXT file, etc.

Next, the wide-angle camera 10 transmits the metadata corresponding to the first view mode to the client terminal 100 (S111).

For example, the metadata corresponding to the quad view mode may be metadata about three regions of interest corresponding to three corrected images.

As another example, the wide-angle camera 10 may transmit the JSON file, the XML file, or the TXT file including the metadata corresponding to the quad view mode to the client terminal 100.

Next, the client terminal 100 sets at least one region of interest in the original image 11 based on the metadata corresponding to the first view mode (S113). For example, the client terminal 100 may set a first region of interest ROI1, a second region of interest ROI2, and a third region of interest ROI3 in the original image 11.

Next, the client terminal 100 generates at least one corrected image in which distortion of the at least one region of interest is corrected (S115). For example, the client terminal 100 may generate a first corrected image in which distortion of the first region of interest ROI1 is corrected, a second corrected image in which distortion of the second region of interest ROI2 is corrected, and a third corrected image in which distortion of the third region of interest ROI3 is corrected.

Next, the client terminal 100 displays the original image and the at least one corrected image (S117). For example, the display module 190 of the client terminal 100 may output the original image 11 and the first through third corrected images on the screen 191 simultaneously.

In detail, the display module 190 may provide a quad view including an original layer LO, a first layer L1, a second layer L2, and a third layer L3. Here, the original image 11 may be displayed on the original layer L0, the first corrected image may be displayed on the first layer L1, the second corrected image may be displayed on the second layer L2, and the third corrected image may be displayed on the third layer L3.

The client terminal 100 may include a plurality of client terminals. According to one or more exemplary embodiments, the plurality of client terminals 100 may set the same region of interest in the original image, based on the metadata stored in the shared memory 20.

Figure 5A:
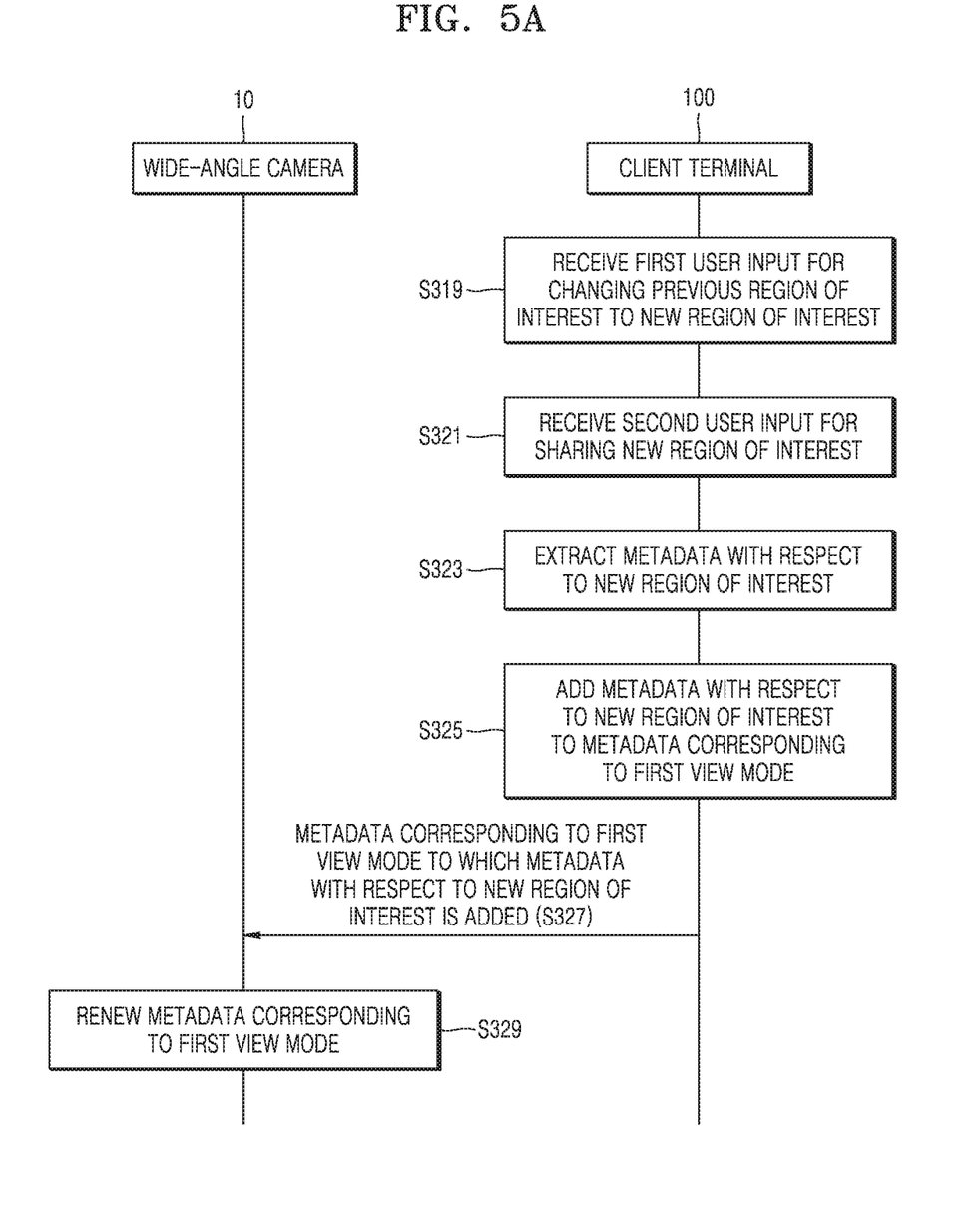
FIGS. 5A and 5C are flow charts and FIG. 5B is a schematic block diagram of a display quad view mode illustrating a wide-angle image processing method according to another exemplary embodiment.
Figure 5B:
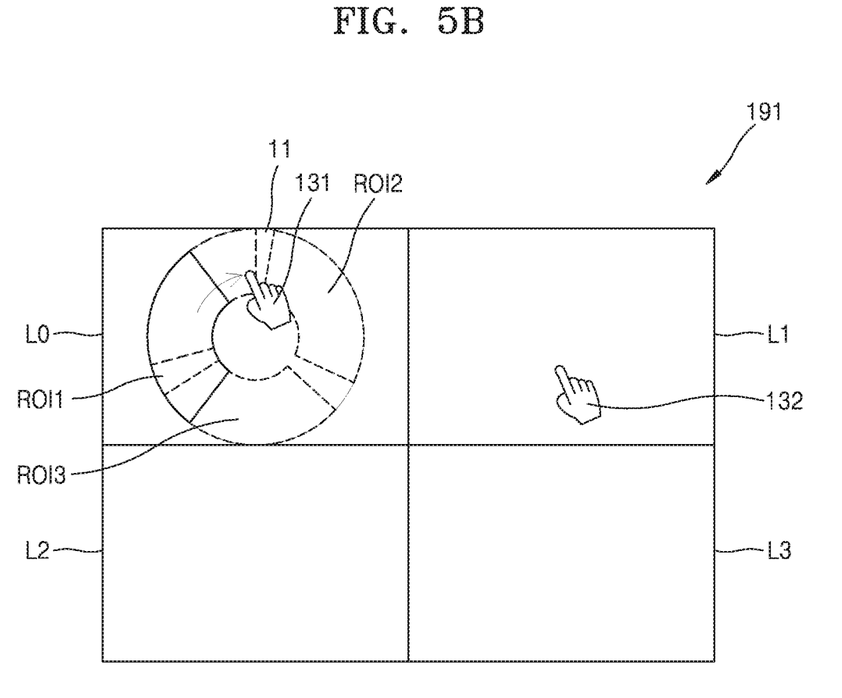
Figure 5C:
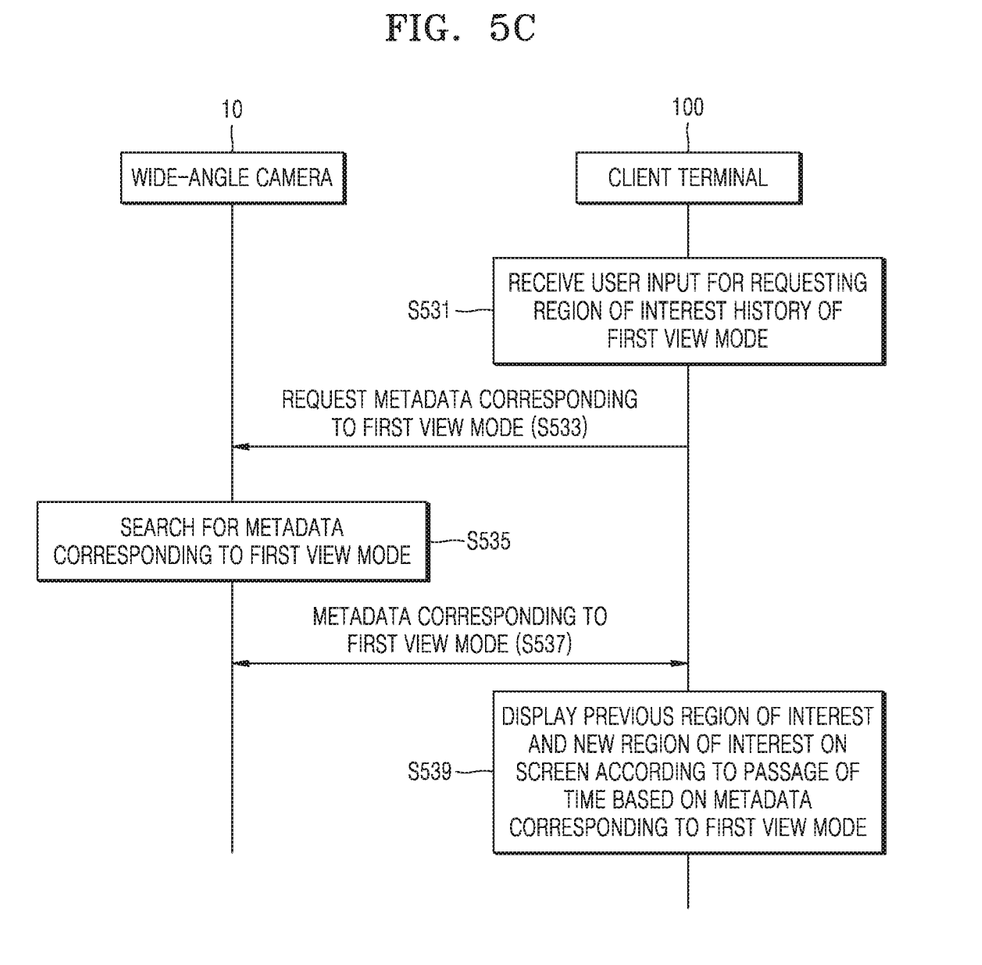

FIGS. 5A and 5C are flow charts and FIG. 5B is a schematic block diagram of a display quad view mode illustrating a wide-angle image processing method according to another exemplary embodiment.

Referring to FIGS. 4A, 4B, 5A, and 5B, the client terminal 100 receives a first user input for changing a previous region of interest included in at least one region of interest to a new region of interest (S319). For example, the first user input may be a user gesture of selecting the first region of interest ROI1 displayed on the original image 11 and dragging and dropping the selected first region of interest ROI1 to the new region of interest.

The client terminal 100 may display a new corrected image in which distortion of the new region of interest is corrected on the first layer L1.

Next, the client terminal 100 receives a second user input for sharing the new region of interest (S321). For example, the second user input may be a mousing-over operation 132 on the first layer L1.

Next, the client terminal 100 extracts metadata about the new region of interest in response to the second user input (S323).

The client terminal 100 may extract the metadata about the new region of interest, when a predetermined time period passes from a time point in which the first region of interest ROI1 is selected and the first region of interest ROI1 is dragged and dropped to the new region of interest.

Next, the client terminal 100 may renew metadata corresponding to a first view mode, by adding the metadata about the new region of interest to the metadata corresponding to the first view mode (S325).

According to an embodiment, the client terminal 100 may renew the metadata corresponding to the first view mode, by accumulating metadata about a previous region of interest and the metadata about the new region of interest.

According to another embodiment, the client terminal 100 may renew the metadata corresponding to the first view mode by deleting the metadata about the previous region of interest and adding the metadata with respect to the new region of interest.

Next, the client terminal 100 transmits the metadata corresponding to the first view mode, in which the metadata with respect to the new region of interest is added, to the wide-angle camera 10 (S327).

For example, the metadata corresponding to the first view mode may be metadata with respect to three regions of interest corresponding to three corrected images corresponding to a quad view mode.

As another example, the metadata corresponding to the first view mode may be a JSON file, an XML, file, or a TXT file including metadata corresponding to the quad view mode.

The client terminal 100 may transmit the metadata about the new region of interest to the wide-angle camera 10.

Next, the wide-angle camera 10 renews the metadata corresponding to the first view mode (S329). In other words, the wide-angle camera 10 may store the renewed metadata corresponding to the first view mode in the shared memory 20 that is embedded.

According to an embodiment, the renewed metadata corresponding to the first view mode may include, for example, the metadata about the previous region of interest and the metadata about the new region of interest, with respect to the first region of interest ROI1.

According to another embodiment, the renewed metadata corresponding to the first view mode may include, for example, metadata about a recent region of interest, with respect to the first region of interest ROI1.

Hereinafter, descriptions about FIGS. 4A, 4B, and 5C may be applied only to a case in which the metadata corresponding to the first view mode includes the metadata about the previous region of interest and the metadata about the new region of interest.

Referring to FIGS. 4A, 4B, and 5C, the client terminal 100 receives a user input for requesting a region of interest history of the first view mode (S531).

Next, when the client terminal 100 requests the metadata corresponding to the first view mode from the wide-angle camera 10 (S533), the wide-angle camera 10 searches for the metadata corresponding to the first view mode in the shared memory 20 (S535).

Next, the wide-angle camera 10 transmits the found metadata corresponding to the first view mode to the client terminal 100 (S537).

The client terminal 100 that receives the metadata corresponding to the first view mode displays the previous region of interest and the new region of interest on a screen according to a passage of time, based on the metadata corresponding to the first view mode (S539).

Figure 6:
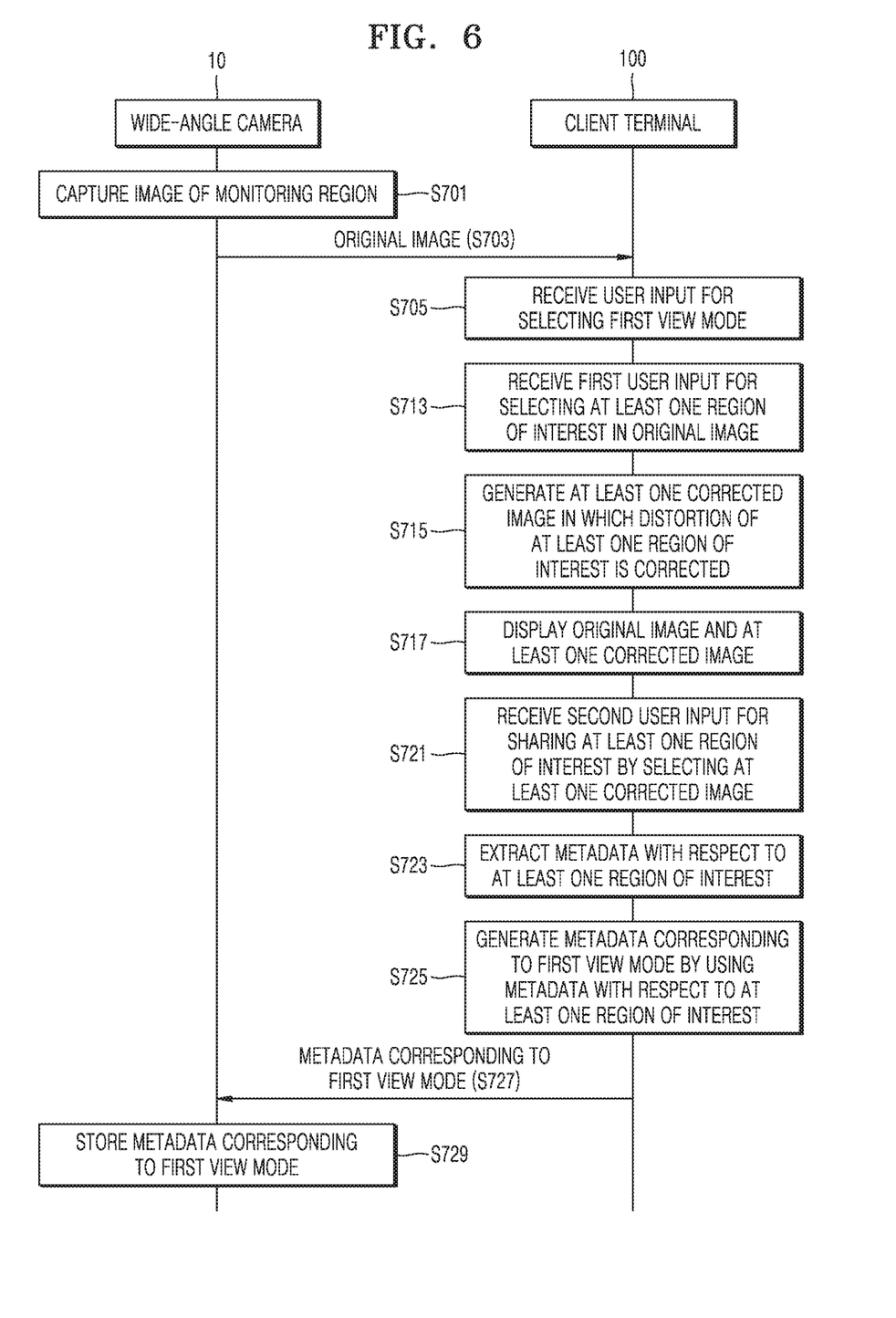
FIG. 6 is a flowchart illustrating a wide-angle image processing method according to still another exemplary embodiment.

FIG. 6 is a flowchart illustrating a wide-angle image processing method, according to still another exemplary embodiment.

Referring to FIG. 6, the wide-angle camera 10 obtains an original image which is a wide-angle image by capturing an image of a monitoring region (S701).

The client terminal 100 receives the original image captured by the wide-angle camera 10 (S703) and receives a user input for selecting a first view mode (S705). For example, the first view mode may be a quad view mode.

According to an exemplary embodiment, the client terminal 100 may provide a user interface through which at least one region of interest of the original image may be selected on a screen, in response to the user input for selecting the first view mode.

According to another exemplary embodiment, the client terminal 100 may request metadata corresponding to the first view mode from the wide-angle camera 10, in response to the user input for selecting the first view mode. Here, only when the client terminal 100 does not receive the metadata corresponding to the first view mode from the wide-angle camera 10, the client terminal 100 may provide the user interface through which at least one region of interest of the original image may be selected on the screen.

Next, the client terminal 100 receives a first user input for selecting at least one region of interest in the original image (S713). For example, the client terminal 100 may receive the first user input for selecting the first region of interest ROI1, the second region of interest ROI2, and the third region of interest ROI3 in the original image.

Next, the client terminal 100 generates at least one corrected image in which distortion of the at least one region of interest is corrected (S715). For example, the client terminal 100 may generate a first corrected image in which the distortion of the first region of interest ROI1 is corrected, a second corrected image in which the distortion of the second region of interest ROI2 is corrected, and a third corrected image in which the distortion of the third region of interest ROI3 is corrected.

Next, the client terminal 100 displays the original image and the at least one corrected image (S717). For example, the display module 190 of the client terminal 100 may simultaneously output the original image and the first through third corrected images on the screen 191.

Next, the client terminal 100 receives a second user input for sharing the at least one region of interest, by selecting the at least one corrected image (S721). For example, the second user input may be the mousing-over operation 132 on the first corrected image.

Next, the client terminal 100 extracts metadata about the at least one region of interest, in response to the second user input (S723). For example, the client terminal 100 may extract metadata with respect to the first corrected image, in response to the mousing-over operation 132 on the first corrected image.

Next, the client terminal 100 generates the metadata corresponding to the first view mode by using the metadata about the at least one region of interest (S725). For example, the client terminal 100 may generate the metadata corresponding to a quad view mode by using the metadata with respect to the first corrected image.

Next, the client terminal 100 transmits the metadata corresponding to the first view mode to the wide-angle camera 10 (S727). For example, the client terminal 100 may transmit the metadata corresponding to the quad view mode to the wide-angle camera 10.

Next, the wide-angle camera 10 stores the metadata corresponding to the first view mode (S729). In other words, the wide-angle camera 10 may store the metadata corresponding to the first view mode in the embedded shared memory 20.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. A method of wide-angle image processing, the method comprising the steps of:
  receiving in a first client terminal having a display an original image captured by a wide-angle camera;
  receiving in the first client terminal a user input for selecting a first view mode for the display;
  requesting metadata corresponding to the first view mode from a shared memory provided in an external device;
  receiving the metadata corresponding to the first view mode from the shared memory; and
  setting at least one region of interest in the original image based on the metadata corresponding to the first view mode,
  receiving a first user input for changing a first region of interest included in the at least one region of interest to a second region of interest;
  receiving a second user input for sharing the second region of interest;
  extracting metadata with respect to the second region of interest in response to the second user input;
  renewing the metadata corresponding to the first view mode by adding the metadata with respect to the second region of interest to the metadata corresponding to the first view mode; and
  transmitting the renewed metadata corresponding to the first view mode to the shared memory.

2. The method of claim 1, wherein the metadata corresponding to the first view mode comprises a virtual pan tilt zoom (PTZ) value with respect to the at least one region of interest.

3. The method of claim 1, wherein the metadata corresponding to the first view mode has a form of at least one of a JavaScript Object Notation (JSON) file, an Extensible Markup Language (XML) file, and a text (TXT) file.

4. The method of claim 1, wherein the external device is the wide-angle camera.

5. The method of claim 1, wherein the external device is an external server.

6. The method of claim 1, wherein the first view mode is a mode for showing the original image and at least one corrected image in which distortion of the at least one region of interest is corrected.

7. The method of claim 1, wherein the step of renewing of the metadata corresponding to the first view mode comprises deleting metadata with respect to the first region of interest from the metadata corresponding to the first view mode.

8. The method of claim 1, wherein, when the metadata corresponding to the first view mode is not received from the shared memory, the method comprising:
  receiving a first user input for selecting at least one region of interest in the original image;
  receiving a second user input for sharing the selected at least one region of interest;
  extracting metadata with respect to the selected at least one region of interest, in response to the second user input;
  generating the metadata corresponding to the first view mode by using the metadata with respect to the selected at least one region of interest; and
  transmitting the generated metadata corresponding to the first view mode to the shared memory.

9. The method of claim 1, wherein at least one operation for processing the wide-angle image is performed by a second client terminal that is different from the first client terminal.

10. A wide-angle image processing apparatus comprising:
  a user interface to receive a user input for selecting a first view mode;
  a communication interface to receive an original image from a wide-angle camera, request metadata corresponding to the first view mode from a shared memory provided in an external device, and receive the metadata corresponding to the first view mode from the shared memory; and
  a processor to set at least one region of interest in the original image based on the metadata corresponding to the first view mode from the shared memory, wherein:
  the user interface is further configured to receive a first user input for changing a first region of interest included in the at least one region of interest to a second region of interest and to receive a second user input for sharing the second region of interest;
  the processor is further configured to renew the metadata corresponding to the first view mode by extracting metadata with respect to the second region of interest in response to the second user input and adding the metadata with respect to the second region of interest to the metadata corresponding to the first view mode; and the communication interface is further configured to transmit the renewed metadata corresponding to the first view mode to the shared memory.

11. The wide-angle image processing apparatus of claim 10, wherein the metadata corresponding to the first view mode comprises a virtual pan tilt zoom (PTZ) value with respect to the at least one region of interest.

12. The wide-angle image processing apparatus of claim 10, wherein the metadata corresponding to the first view mode has a form of at least one of a JavaScript Object Notation (JSON) file, an Extensible Markup Language (XML) file, and a text (TXT) file.

13. The wide-angle image processing apparatus of claim 10, the external device is the wide-angle camera.

14. The wide-angle image processing apparatus of claim 10, wherein the external device is an external server.

15. The wide-angle image processing apparatus of claim 10, wherein the first view mode is a mode for showing on a display the original image and at least one corrected image in which distortion of the at least one region of interest is corrected.

16. The wide-angle image processing apparatus of claim 10, wherein:

the user interface is further configured to receive a user input for requesting a region of interest history of the first view mode;

the communication interface is further configured to request the renewed metadata corresponding to the first view mode from the shared memory and receive the renewed metadata corresponding to the first view mode from the shared memory; and the processor is further configured to show the first region of interest and the second region of interest in the original image on a screen according to a passage of time, based on the renewed metadata corresponding to the first view mode.

17. The wide-angle image processing apparatus of claim 10, wherein the processor is further configured to renew the metadata corresponding to the first view mode by deleting metadata with respect to the first region of interest from the metadata corresponding to the first view mode.

18. The wide-angle image processing apparatus of claim 10, wherein, when the communication interface does not receive the metadata corresponding to the predetermined view mode from the shared memory, the user interface is further configured to receive the first user input for selecting at least one region of interest in the original image and to receive the second user input for sharing the selected at least one region of interest, and the processor is further configured to extract metadata with respect to the selected at least one region of interest in response to the second user input, generate the metadata corresponding to the first view mode by using the metadata with respect to the selected at least one region of interest, and transmit the generated metadata corresponding to the first view mode to the shared memory through the communication interface.

19. The method of claim 1, wherein the metadata corresponding to the first view mode comprises a location value of the at least one region of interest.

20. The wide-angle image processing apparatus of claim 10, wherein the metadata corresponding to the first view mode comprises a location value of the at least one region of interest.

\* \* \* \* \*